US008509121B2

(12) United States Patent
Dailey (10) Patent No.: US 8,509,121 B2
(45) Date of Patent: Aug. 13, 2013

(54) SYSTEM AND METHOD USING LOCAL WIRELESS NETWORK FOR GROUP COMMUNICATIONS (75) Inventor: Timothy Eugene Dailey, Forest, VA (US)

(73) Assignee: Pine Valley Inestments, Inc., Las Vegas, NV (US)

( * ) Notice: Subject to any disclaimer, the term of this patent is extended or adjusted under 35 U.S.C. 154(b) by 750 days.

(21) Appl. No.: 12/351,656

(22) Filed: Jan. 9, 2009

(65) Prior Publication Data
US 2010/0178911 A1 Jul. 15, 2010

(51) Int. Cl.
H04L 12/18 (2006.01)
H04W 4/10 (2009.01)
H04B 7/24 (2006.01)

(52) U.S. Cl.
USPC ........... 370/261; 370/270; 370/331; 455/416; 455/519

(58) Field of Classification Search
USPC ................. 370/259–263, 270–271, 347, 389, 370/465–467; 455/415, 416, 428, 435, 517–519, 520, 466, 455/509, 533.1, 458, 456; 709/203, 227–228; 379/202.01, 207.01
See application file for complete search history.

(56) References Cited

U.S. PATENT DOCUMENTS

| | | | |
|---|---|---|---|
| 6,275,500 B1 * | 8/2001 | Callaway et al. | 370/449 |
| 6,405,027 B1 | 6/2002 | Bell | |
| 6,904,023 B2 | 6/2005 | Albal et al. | |
| 7,164,887 B2 * | 1/2007 | Tanada et al. | 455/41.2 |
| 7,184,790 B2 | 2/2007 | Dorenbosch et al. | |
| 7,417,962 B2 * | 8/2008 | McBride | 370/310 |
| 7,583,932 B2 * | 9/2009 | Lin | 455/41.2 |
| 7,920,887 B2 * | 4/2011 | Cho et al. | 455/518 |
| 2004/0151138 A1 | 8/2004 | Paltemaa | |
| 2004/0190468 A1 * | 9/2004 | Saijonmaa | 370/312 |
| 2005/0239405 A1 * | 10/2005 | Myyry et al. | 455/41.2 |
| 2007/0086473 A1 * | 4/2007 | Lin et al. | 370/445 |
| 2008/0159507 A1 * | 7/2008 | Virolainen et al. | 379/202.01 |
| 2008/0205314 A1 * | 8/2008 | Pecen | 370/310 |
| 2009/0054058 A1 * | 2/2009 | Andreasson et al. | 455/426.1 |
| 2009/0253418 A1 * | 10/2009 | Makinen | 455/416 |
| 2009/0323569 A1 * | 12/2009 | Wentink | 370/311 |
| 2010/0167711 A1 * | 7/2010 | Alameh et al. | 455/416 |
| 2010/0219250 A1 * | 9/2010 | Wang | 235/462.43 |

FOREIGN PATENT DOCUMENTS
WO WO2007/003683 * 1/2007

* cited by examiner

Primary Examiner — Habte Mered
(74) Attorney, Agent, or Firm — Fox Rothschild, LLP; Robert J. Sacco (57) ABSTRACT A system and method using a local wireless network for group communications are provided. The method includes establishing one of a plurality of mobile communication units as a master communication unit and establishing as slave communication units each of the plurality of mobile communication units that are not established as the master communication unit. The method further includes communicating group call information only to the master communication unit with the master communication unit redistributing the group call information to the slave communication units using a local wireless communication network.

20 Claims, 4 Drawing Sheets

SYSTEM AND METHOD USING LOCAL WIRELESS NETWORK FOR GROUP COMMUNICATIONS

BACKGROUND OF THE INVENTION

This invention relates generally to wireless communication systems, and more particularly, to systems and methods providing local wireless communications between radio units within a talk group.

Wireless communication systems may provide communication between individual users and/or between groups of users, such as group calls in Push-to-Talk (PTT) cellular wireless communication systems. Group based communications also may be provided in other types of communication systems, such as public safety or professional communication systems, as well as others. Radio frequency communication between cellular or radio units allows messages to be communicated between two users or between a group of users. In particular, using these communication systems with PTT services, which may include a dispatch mode of operation, wherein a dispatcher from a central location communicates with one or more radio units, or where multiple radios or cellular units inter-communicate, work groups performing a job or project or emergency personnel responding to an emergency at a building may communicate.

Group communications require connection of multiple radios or cellular units. Systems are known that provide multicast communications where multiple users share a single call stream or channel. In other known systems, group calls are realized using individual call streams sent to each user. Multicast communications are typically preferred over single stream communications because multicast communications require less bandwidth for group calls. However, group calls may be desirable or needed on systems that do not support multicast communications. Accordingly, single stream communications must be provided. For example, Enhanced Data rates for GSM Evolution (EDGE) communication systems do not support multicast communications, but may be used in applications where group communications are desirable or needed. In the EDGE systems, group calls are sent over single streams of the cellular data service offered by EDGE using Voice-over-Internet-Protocol (VoIP).

In communication systems wherein group calls require individual communication streams, if users are in different communication cells, bandwidth usage is not minimized with multicast communications because the data must be sent at least once to each cell containing a user. However, if multiple users on the same group call are in the same communication cell, multiple single communication streams transmitting the same data must be sent. Depending on the number of users on the group call in the single communication cell, the data can overload the capacity or bandwidth of the communication cell.

BRIEF DESCRIPTION OF THE INVENTION

In accordance with an embodiment, a method for communicating group call information is provided. The method includes establishing one of a plurality of mobile communication units as a master communication unit and establishing as slave communication units each of the plurality of mobile communication units that are not established as the master communication unit. The method further includes communicating group call information only to the master communication unit with the master communication unit redistributing the group call information to the slave communication units using a local wireless communication network.

In accordance with another embodiment, a wireless communication system is provided that includes a plurality of mobile communication units each configured to communicate on a group call and communicate using a local wireless protocol. One of the plurality of mobile communication units is a master communication unit and the other mobile communication units in the plurality of mobile communication units are slave communication units. The wireless communication system further includes a controller configured to communicate group call information only to the master communication unit during the group call. The master communication unit is configured to communicate the group call information to the plurality of mobile communication units using the local wireless protocol.

In accordance with yet another embodiment, a computer readable medium is provided having instructions thereon configured to instruct a processor to establish one of a plurality of mobile communication units as a master communication unit and establish as slave communication units each of the plurality of mobile communication units that are not established as the master communication unit. The computer readable medium further includes instructions thereon configured to instruct the processor to communicate group call information only to the master communication unit with the master communication unit redistributing the group call information to the slave communication units using a local wireless communication network.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the invention provide a system and method for using local wireless communications in connection with group communications. The various embodiments use the local wireless communications to redistribute group call information to local group members, thereby reducing the bandwidth required on the communication system (e.g., cellular communication system).

The various embodiments may be implemented in connection with any type of wireless communication system wherein groups of users communicate. The wireless communication system allows groups calls between a plurality of users. In various embodiments, the wireless communication system provides groups calls using single stream communications (and does not support multicast communications). The various embodiments may be implemented, for example, in connection with radios within a public safety or professional communication system or cellular telephones in a commercial communication system. Accordingly, although the various embodiments may be described in connection with a particular wireless communication system, radio or cellular unit, or communication protocol, the various embodiments may be implemented in connection with different radio or cellular units communicating using different systems or protocols. For example, the cellular unit may be any type of cellular telephone or communication device that allows group calls, for example, using a Push-to-Talk (PTT) function as is known. As another example, the radio unit may be a land mobile radio (LMR) configured to communicate using the Enhanced Data rates for GSM Evolution (EDGE) standard and Voice-over-Internet-Protocol (VoIP).

However, the various embodiments may be implemented in connection with any communication system providing group calls, particularly where single streams of data are communicated during group calls. Accordingly, other communication systems, such as communication systems using the Public Safety Frequency Bands within the VHF, UHF, 700 MHz, 800 MHz and 900 MHz frequencies may be used. Additionally, different cellular communication systems may be used, such as 3G or other mobile networking technologies.

Figure 1:
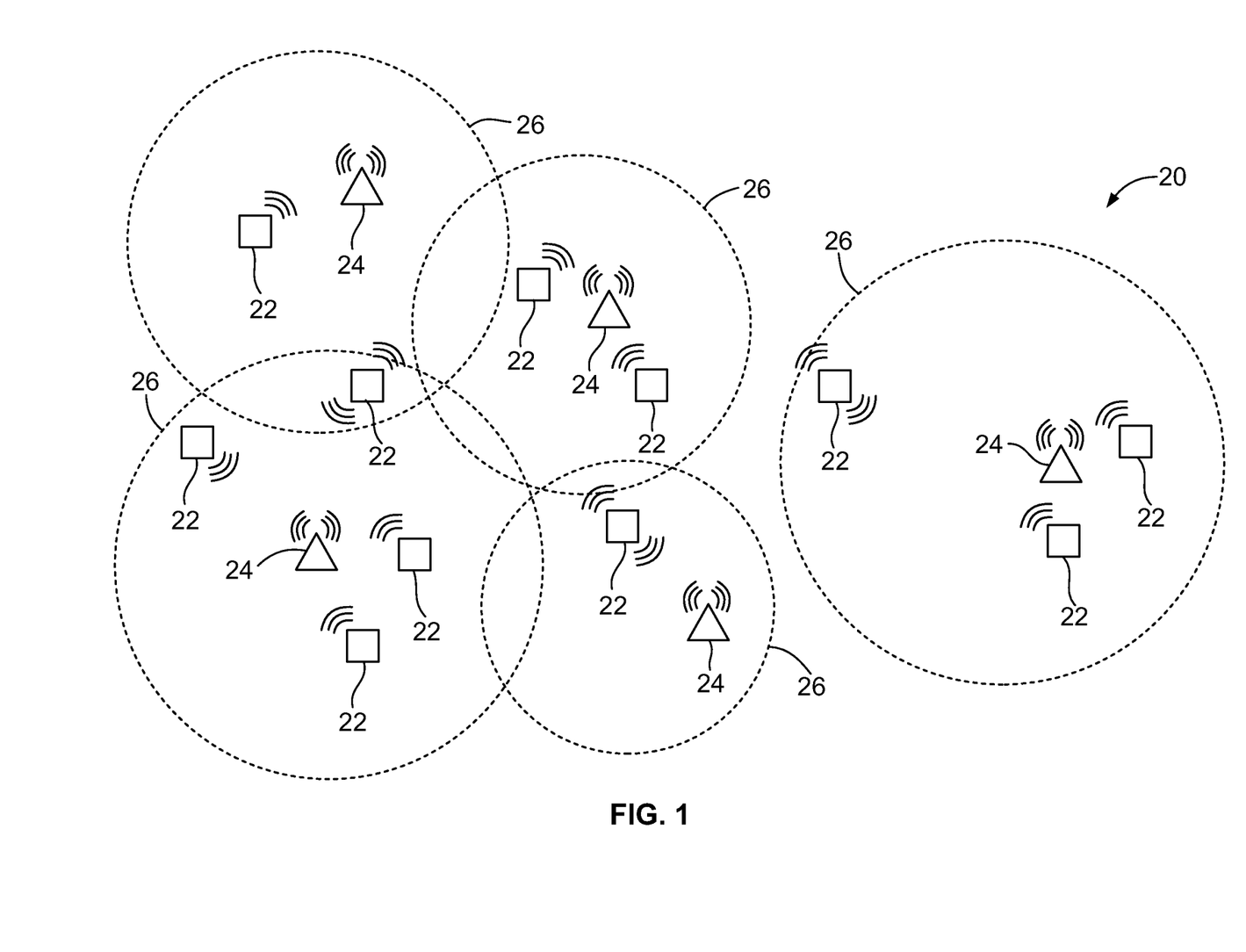
FIG. 1 is a block diagram of a wireless communication system in connection with which various embodiments of the invention may be implemented.

As shown in FIG. 1, a wireless communication system 20, for example, a cellular communication system supporting PTT functionality using single data streams and constructed according to various embodiments of the invention provides group communications between communication units 22 (or terminals), such as cellular telephone handsets configured for mobile operation. It should be noted that when reference is made herein to a communication unit, this refers to any type of communication device, particularly a mobile communication device, capable of providing two-way or bi-directional communication and group calling capabilities. For example, the communication unit 22 may be a cellular telephone providing PTT group calling. However, the communication unit 22 may be an LMR providing PTT capabilities such that communications between the communication units 22 uses an EDGE network. In the various embodiments, the communication system 20 includes a plurality of communication coverage areas defined by a plurality of communication base stations 24 and associated communication towers. Within the communication coverage area, Radio Frequency (RF) coverage is provided by each of the base stations 24 and defines a plurality of communication cells 26 with one or more of the communication units 22 capable of being within each communication cell 26. The communication cells 26 may or may not overlap.

Additionally, the communication units 22 may communicate directly with each other or with a group of communication units 22 within a single communication cell 26 using a local wireless technology as described in more detail herein. For example, a plurality of users within a single communication cell 26 may communicate using a local wireless technology such as Bluetooth or a wireless local area network (WLAN) communication protocol, such as IEEE 802.11. During group calls, the various embodiments redistribute group call information to multiple users within a single communication cell 26 using the local wireless technology, which essentially forms a local wireless network for group calling with a single communication cell 26.

Figure 2:
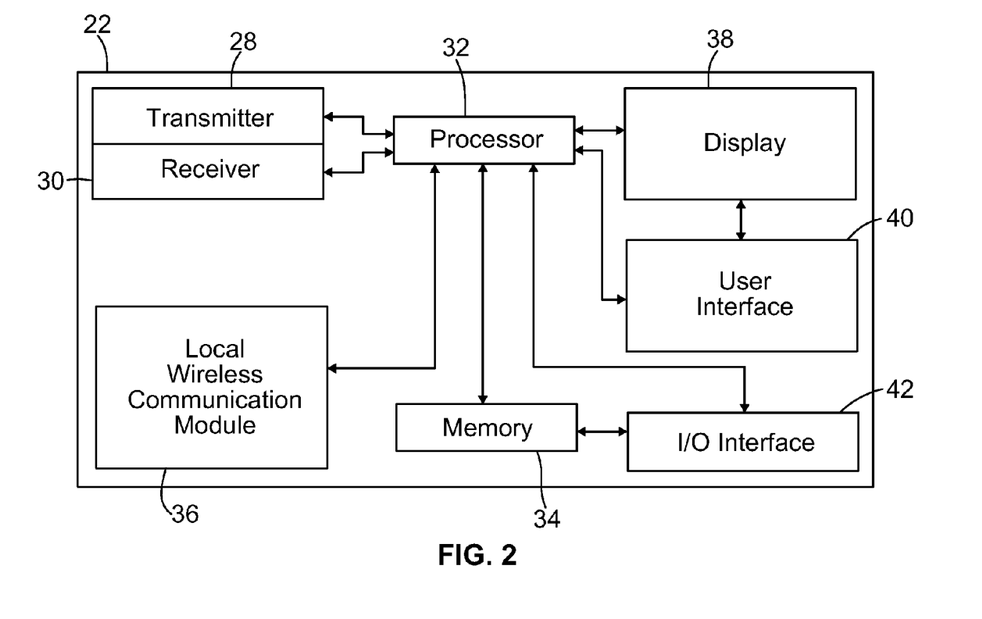
FIG. 2 is a block diagram of a communication unit constructed in accordance with various embodiments of the invention.

Various embodiments of the invention include communication units 22 configured to provide two different types of communication. In particular, the communication units 22 provide long range communication via the communication base stations 24 using a system protocol (e.g., EDGE or 3G). The communication units 22 also provide short range communication to form an ad hoc local communication network using a local wireless communication protocol (e.g., Bluetooth or WLAN). In general, the communication units 22, which may be, for example, cellular communication devices or LMR devices, include a transmitter 28 and a receiver 30 as shown in FIG. 2. The transmitter 28 and receiver 30 may be provided separately or as a single unit, for example, as a transceiver. The transmitter 28 and receiver 30 are configured to provide a first type of communication, which in the various embodiments is the long range communication via the communication base stations 24.

The transmitter 28 and receiver 30 are connected to a processor 32, which is also connected to a memory 34. The processor 26 is also connected to a local wireless communication module 36 configured to provide a second type of communication, which in the various embodiments is the short range communication that allows an ad hoc local communication network between a plurality of communication units 22 to be formed. The local wireless communication module 36 may include capabilities to transmit or receive (e.g., a Bluetooth transmitter/receiver) or may use the transmitter 28 and receiver 30 to provide the short range communication of data or voice. The local wireless communication module 36 may be provided in any known manner than allows communication over shorter distances, for example, within a portion of a single communication cell 26 (shown in FIG. 1), within a predetermined range (e.g., within 100 feet, 1/10 of a mile, etc.), at a lower communication power levels, etc.

The communication unit 22 also optionally includes a display 38 that is also connected to the processor 32 and to a user interface 40. An input/output (I/O) interface 42 is connected to the processor 32 and the memory 34. The display 38 may be any type of display capable of displaying text and/or graphics with the user interface 40 including user depressible buttons for entering information or requests. The memory 34 may include one or more portions of non-volatile memory and also may be configured to be removed from the communication unit 22 (e.g., a memory module or flash memory). The memory 34 also may include other types of memory components or portions such as Random Access Memory (RAM) and/or Read Only Memory (ROM) and which may be configured to store different types of information. The I/O interface 42 may be any type of interface or port that allows data to be transferred into and out of the communication unit 22. For example, the I/O interface 42 may be a serial port or Universal Serial Bus (USB) port.

In operation, the communication unit 22 provides both long range communication and short range communication using different communication standards or protocols. The communication unit 22 is also configured to allow group communications, which may be provided in any known manner. For example, the user interface 40 may include a PTT button to initiate a group call with other communication units 22.

Figure 3:
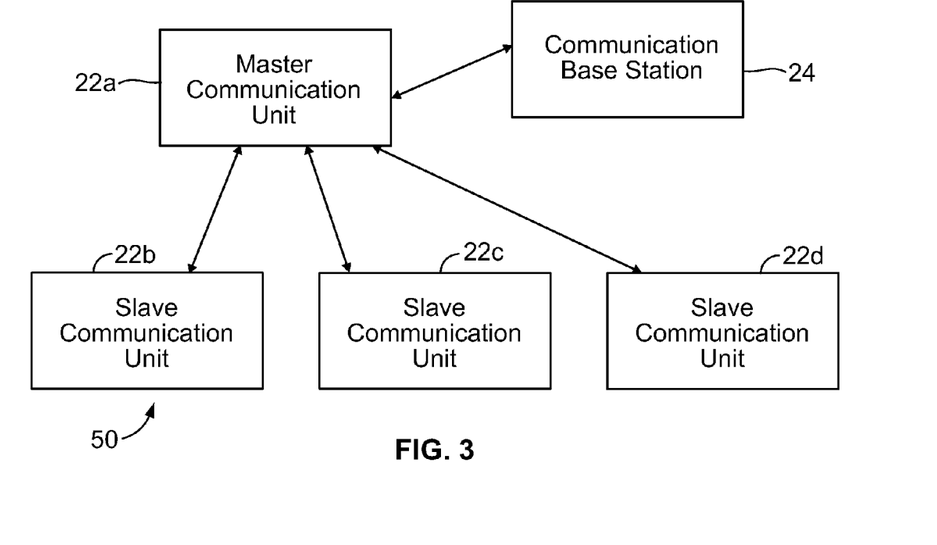
FIG. 3 is a block diagram of a master/slave arrangement formed between communication units in accordance with various embodiments of the invention.

In accordance with various embodiments of the invention, the local wireless communication module 36 is configured to redistribute group call information to local group members. In some embodiments, a master/slave arrangement 50 is established as shown in FIG. 3 to form an ad hoc local communication network, particularly within a single communication cell 26 (shown in FIG. 1). The master/slave arrangement 50 includes one communication unit 22a as the master communication unit with the remaining communication units 22b, 22c and 22d as slave communication units. The master communication unit 22a communicates with the communication base station 24 using the transmitter 28 and receiver 30 (shown in FIG. 2) to provide the long range communication. The master communication unit 22a communicates with the slave communication units 22b, 22c and 22d using the local wireless communication module 36 (shown in FIG. 2) to provide short range communication. In operation, the slave communication units 22b, 22c and 22d that are within a predetermined range of the master communication unit 22a, for example, within a portion of the same communication cell, within the same communication cell and within a predetermined range (e.g., 100 feet, 200 feet, etc.) of each other, within the predetermined range, etc. and communicating on a group call, communicate only with the master communication unit 22a during group calls. Accordingly, the maser communication unit 22a redistributes group call information to the slave communication units 22b, 22c and 22d.

It should be noted that in some embodiments, the slave communication units 22b, 22c and 22d optionally or alternatively may communicate directly with each other. It also should be noted that the communication between the master communication unit 22a and the slave communication units 22b, 22c and 22d to form the ad hoc local communication network may be provided in any known manner.

Figure 4:
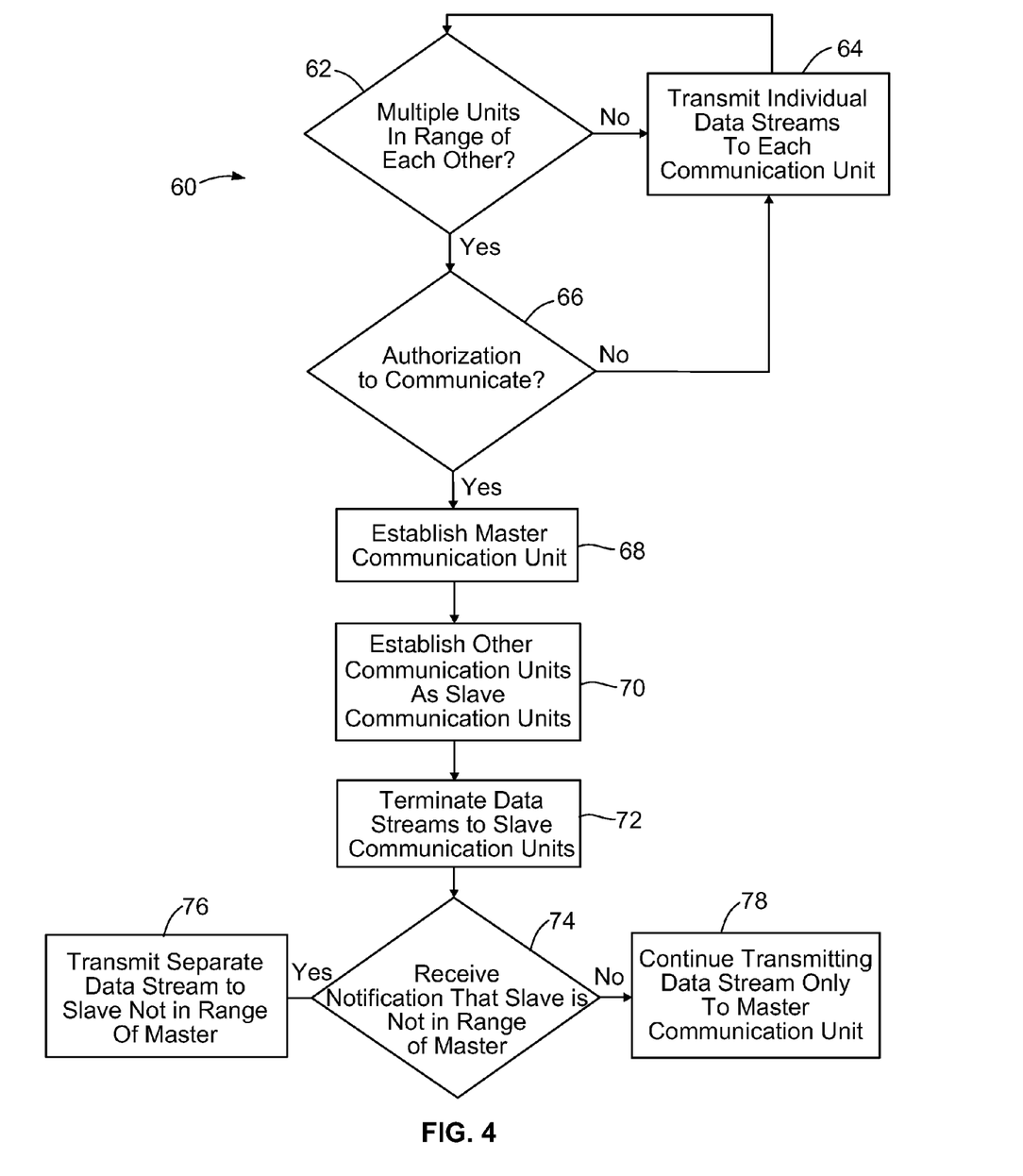
FIG. 4 is a flowchart of a method to form an ad hoc local network to redistribute group call information to local group members in accordance with various embodiments of the invention.

In accordance with various embodiments of the invention, a method 60 is provided as shown in FIG. 4 to form an ad hoc local communication network to redistribute group call information to local group members. The method 60 includes determining at 62 whether more than one communication unit (or user) is within a predetermined range of each other. For example, in a cellular communication system, using known triangulation methods or alternatively, a Global Positioning System (GPS), the location of communication units may be determined. The predetermined range also may be determined to exist when the communication units are capable of communicating using a local wireless communication module. The predetermined range may be defined as (i) a portion of a single communication cell, (ii) within the same communication cell and within a predetermined range (e.g., 10 feet, 100 feet, 200 feet, etc.) of each other within that communication cell, (iii) within the predetermined range, etc. In general, a determination is made as to whether a communication unit participating in a group call is within range of another communication unit to allow the two communication units to communicate using a local wireless communication standard or protocol.

If a determination is made at 62 that none of the communication units in a group call are within a predetermined range of each other, then at 64 individual data streams are transmitted to each of the communication units, for example, within a single communication cell. Thus, each communication unit receives a separate transmission of group call information from a communication site or base station.

If a determination is made at 62 that at least two of the communication units in a group call are within a predetermined range of each other, then at 66 a determination is made as to whether the communication units are authorized to communicate. For example, a determination may be made as to whether the communication units are authorized to form an ad hoc local communication network or communicate with one another via the local wireless technology, such as by performing a Bluetooth or IEEE 802.11 discovery process as is known. This determination may also include assessing the communication privileges of each of the communication units. If a determination is made at 66 that the communication units are not authorized to communicate, then at 64 individual data streams are transmitted to each of the communication units, for example, within a single communication cell.

If a determination is made at 66 that the communication units are authorized to communicate with each other, a master communication unit is established at 68. In particular, one of the communication units is selected as a master unit to receive group call information from the communication site or base station. The master communication unit is selected locally, for example, by one of the communication units declaring or assigning itself as the master communication unit. However, it should be noted that the determination of which communication unit is the master communication unit and which communication units are the slave communication units may be provided in any known manner. For example, the communication unit with the highest Media Access Control (MAC) address may become the master communication unit with the other communication units becoming slave communication units. Thereafter, if communication with the master communication unit is lost (e.g., moves out of communication range), then the communication unit with the next highest MAC address becomes the master communication unit.

After establishing the master communication unit, the master communication unit then receives groups call information using long range communication and redistributes the group call information to the slave communication units within the predetermined range. It should be noted that as the size of the call group grows or as otherwise desired, more than one communication unit may be assigned as the master communication unit.

Figure 5:
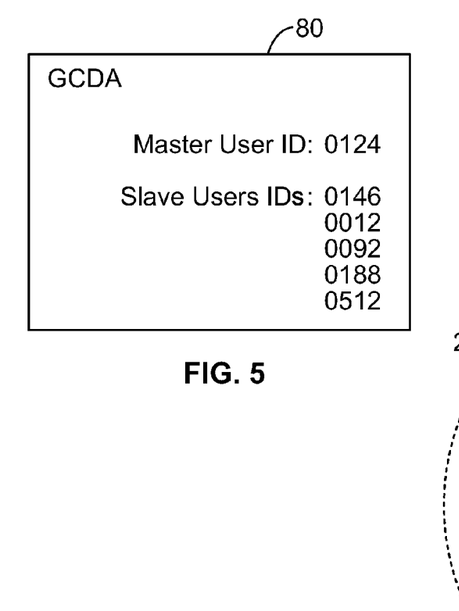
FIG. 5 is a block diagram of a group call distribution application (GCDA) unit constructed in accordance with various embodiments of the invention.

Thus, after one of the communication units is established as the master communication unit, the remaining communication unit(s) within the predetermined range are established as slave communication units at 70. In particular, each of the remaining communication units that are not the master communication unit(s) are established locally as slave communication units and communicate directly with the master communication unit during the group call. For example, after one of the plurality of communication units in the range of the other communication units becomes the master communication unit (e.g., declares itself the master communication unit), the other communication units become slave communication units. The slave communication units communicate with the master communication unit using a short range communication protocol, for example, Bluetooth or a WLAN protocol such as IEEE 802.11. It should be noted that each of the slave communicate units communicates a slave status notification to a group call distribution application (GCDA) unit 80 as shown in FIG. 5 that maintains a list of the communication units having slave status. The GCDA optionally may maintain a list of one or more master communication units. Thus, the GCDA unit 80 stores a list of the slave communication units in the group call. Accordingly, in operation, the GCDA unit 80 does not communicate any group call information to the slave communication units, which are identified by the notifications from the salve communication units, and only communicates group call information to the master communication unit. The GCDA unit 80 generally resides in the infrastructure of the communication system, for example, in the base station or in a central controller. It should be noted that the GCDA unit 80 may be implemented in hardware, software or a combination thereof.

Specifically, and referring again to FIG. 4, once the master communication unit and slave communication units have been established at 68 and 70, respectively, which is performed locally, for example, by the communication units determining or selecting which communication unit is the master communication unit with the remaining communication units becoming slave communication units, transmission of group call information to the slave communication units is terminated at 72. For example, a controller, such as the GCDA unit 80 (shown in FIG. 5), only communicates group call information to the master communication unit. During the group call, and as described in more detail herein, the master communication unit then communicates the group call information to the salve communication units using the ad hoc local communication network.

Once the master/slave arrangement has been established, thereby forming, for example, the ad hoc local communication network, a determination is made at 74 as to whether notification has been received that a slave communication unit is no longer within the predetermined range of the master communication unit. For example, once the local wireless communication has been terminated between a slave communication unit and the master communication unit, such as when the slave communication unit has exceeded the Bluetooth communication range of the slave or master communication unit, the slave communication unit provides notification of such termination of local wireless communication. For example, the slave communication unit may notify the GCDA unit 80 (shown in FIG. 5) that the slave communication unit is no longer connected via the local wireless connection to the master communication unit during the group call.

If notification is received that the slave communication unit is no longer within the predetermined range of the master communication unit, then at 76 a separate data stream of group call information is transmitted to that slave communication unit, which no longer has slave status (as the master communication unit can no longer communicate group call information to the slave communication unit). It should be noted that the slave communication unit may again connect to the master communication unit if the slave communication unit again returns to within the predetermined range of the master communication unit. The slave communication unit also may connect with another master communication unit or itself may become a master communication unit.

If notification is not received of any slave units leaving the predetermined communication range of the master communication unit, then at 78 a single data stream of group call information is transmitted only to the master communication unit. The master communication unit continues to communicate with slave communication units using the ad hoc local communication network. It should be noted that if the master communication unit is no longer in the range of one or more the slave communication units, one of the slave communication units may be established locally as the master communication unit. Additionally, and for example in some embodiments, if a communication unit enters the communication range of a plurality of communication units on a group call, and the communication unit has a higher MAC address than the current master communication unit, the new communication unit still is established as a slave communication unit. Alternatively, and in other embodiments, the new communication unit with the higher MAC address is established as the master communication unit, with the other master communication unit becoming a slave communication unit.

Accordingly, various embodiments of the invention may be used, for example, when users of a group communication are clustered in physical proximity, such as when users of group communications are physically near each other. As an example, a utility line crew may include several individuals working on the same repair. As other examples, public safety personnel may converge on the scene of an incident or building construction crews may work closely together on the same portion of a project. In such instances, and in accordance with various embodiments of the invention, cellular handsets or land mobile radios having local wireless technology, for example, Bluetooth or IEEE 802.11 use the local wireless technology to redistribute group call information to local members using a master/slave arrangement in an ad hoc local wireless communication network.

Thus, in accordance with various embodiments of the invention, local wireless technology is used to form an ad hoc local communication network when multiple communication units (e.g., cellular handsets) are in range of each other (and appropriate authorization is achieved). One member of the ad hoc local communication network is established as the master communication unit and the other communication units in the group call are established as slave communication units to the master communication unit. Notification of the master and slave status is provided indicating that the slave communication units do not require separate call streams for specific groups. Accordingly, group call information will no longer be transmitted to the slave communication units as the master communication unit redistributes the group call information from the communication site (e.g., cellular site) to the slave communication units using the ad hoc local communication network. When slave communication units move out of the ad hoc local communication network range, namely, out of the range of the master communication unit, a separate stream of data is again communicated to that communication unit and the master communication unit stops redistributing the group call information to that slave communication unit.

Figure 6:
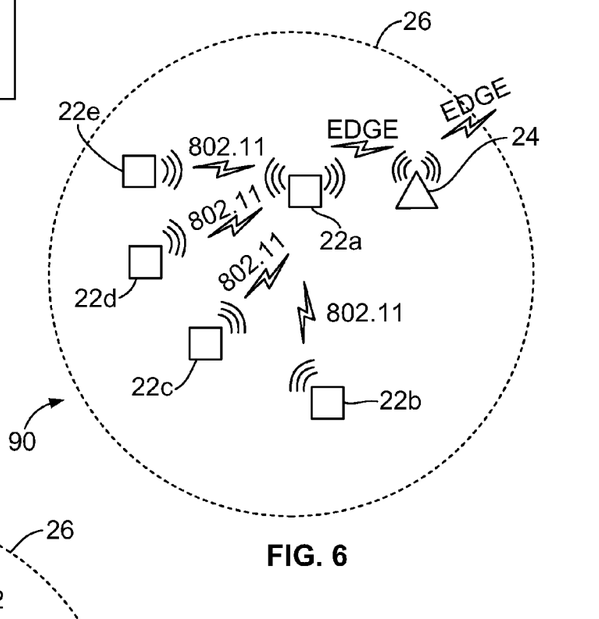
FIG. 6 is a diagram illustrating an ad hoc local communication network for group calls formed in accordance with various embodiments of the invention.
Figure 7:
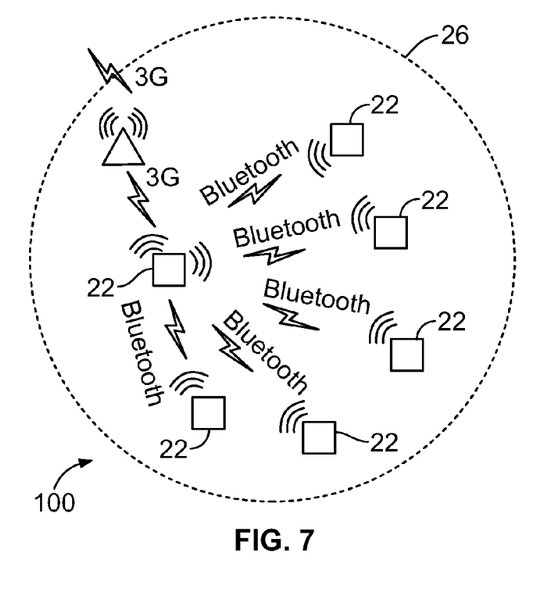
FIG. 7 is a diagram illustrating another ad hoc local communication network for group calls formed in accordance with various embodiments of the invention.

Thus, as shown in FIGS. 6 and 7, ad hoc local communication networks 90 and 100, respectively, may be formed between a plurality of communication units 22. For example, the ad hoc local communication network 90 provides redistribution of group call information between radios (e.g., between the master communication unit 22a and the slave communication units 22b-22e), such as LMRs, using IEEE 802.11 with the master communication unit 22a communicating with the communication base station 24 using an EDGE protocol. The ad hoc local communication network 100 illustrates redistribution of group call information between cellular telephones (e.g., between the master communication unit 22a and the slave communication units 22b-22e) using Bluetooth with the master communication unit 22a communicating with the communication base station 24 using a 3G protocol.

The various embodiments thereby provide communication of group call information from a master communication unit to slave communication units using a local wireless technology. Accordingly, group call bandwidth is reduced.

The various embodiments or components, for example, the communication systems, networks or controllers therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for communicating group call information, the method comprising;
    establishing a group call communication session between a wireless communication infrastructure and a plurality of communication units;
    identifying, among said plurality of communication units in said group call communication session, a master communication unit and at least one slave communication unit capable of communication with said master communication unit via a local wireless communication protocol;
    communicating a slave status notification to said wireless communication infrastructure using a long range wireless communication protocol, said slave status notification comprising an identifier for said at least one slave communication unit;
    communicating, during said group call communication session, group call information from the wireless communication infrastructure to the master communication unit, and exclusive of communication to said at least one slave communication unit, using said long range wireless communication protocol;
    redistributing the group call information from the master communication unit to the at least one slave communication unit using said local wireless communication protocol;
    communicating a termination notification from said at least one slave communication unit to said wireless communication infrastructure when said at least one slave communication unit is not capable of communication with said master communication unit via said local wireless communication protocol, said termination notification comprising an identifier for said at least one slave communication unit; and subsequent to said communicating said termination notification, continuing to communicate said group call information, using said long range communication protocol, from said wireless communication infrastructure to the at least one slave communication unit that corresponds to said identifier.

2. A method in accordance with claim 1, wherein said identifying comprises determining that said master communication unit and said at least one slave communication unit are capable of communicating via said local wireless communication protocol based on geographic location information.

3. A method in accordance with claim 2, further comprising:

communicating said termination notification from said at least one slave communication unit to said wireless communication infrastructure via said long range wireless communication protocol.

4. A method in accordance with claim 1 further comprising forming an ad hoc local wireless communication network between the master communication unit and the at least one slave communication unit.

5. A method in accordance with claim 4 further comprising confirming that the master communication unit and the at least one slave communication units unit are authorized to communicate using the ad hoc local wireless communication network.

6. A method in accordance with claim 1 wherein the plurality of communication units comprise land mobile radios.

7. A method in accordance with claim 1 wherein the plurality of communication units comprise cellular communication devices.

8. A method in accordance with claim 1 wherein the plurality of communication units are configured to communicate in a communication system providing only single stream data communications to each of the plurality of communication units during a group call.

9. A method in accordance with claim 1 wherein the local wireless communication protocol is one of a Bluetooth protocol and a wireless local area network (WLAN) communication protocol.

10. A method in accordance with claim 1 wherein the plurality of communication units are within a single communication cell.

11. A method in accordance with claim 1, wherein said at least one slave communication unit communicates said slave status notification to said wireless communication infrastructure via said long range wireless communication protocol, exclusive of said short-range wireless communication protocol.

12. A method in accordance with claim 1, further comprising:

maintaining, in said wireless communication infrastructure, a list of slave communication units in said group call communication session;

receiving said slave status notification comprising said identifier; and in response to said receiving, updating said list to include said identifier.

13. A wireless communication system comprising:

a plurality of mobile communication units each configured to communicate on a group call and communicate using a local wireless protocol, said plurality of mobile communication units comprising a master communication unit and at least one slave communication unit;

a wireless communication infrastructure including a controller configured to establish a group call communication session with said plurality of mobile communication units using a long range wireless communication protocol, to receive a slave status notification comprising an identifier for said at least one slave communication unit, and to use said group call communication session to communicate group call information to the master communication unit during the group call, and exclusive of communication to said at least one slave communication unit, using said long range wireless communication protocol;

wherein the master communication unit is configured to communicate the group call information received from the controller during said group call communication session, to the at least one slave communication unit using the local wireless protocol;

wherein said at least one slave communication unit is configured to communicate a termination notification from said at least one slave communication unit to said wireless communication infrastructure when said at least one slave communication unit is not capable of communication with said master communication unit via said local wireless communication protocol, said termination notification comprising an identifier for said at least one slave communication unit; and wherein the wireless communication infrastructure is configured to continue to communicate said group call information to the at least one slave communication unit that corresponds to said identifier subsequent to receiving said termination notification, and using said long range communication protocol.

14. A wireless communication system in accordance with claim 13 wherein the local wireless protocol comprises one of a Bluetooth protocol and a wireless local area network (WLAN) communication protocol.

15. A wireless communication system in accordance with claim 13 wherein the plurality of mobile communication units are within a single communication cell.

16. A wireless communication system in accordance with claim 15 wherein each of the plurality of mobile communication units is configured to determine whether it is within a predetermined range of another one of said plurality of mobile communication units.

17. A wireless communication system in accordance with claim 13 wherein the plurality of mobile communication units are configured to communicate using one of a land mobile radio protocol and a cellular protocol.

18. A wireless communication system in accordance with claim 17 wherein the land mobile radio protocol comprises an Enhanced Data rates for GSM Evolution (EDGE) protocol.

19. A wireless communication system in accordance with claim 13 wherein the plurality of mobile communication units comprise one of land mobile radios and cellular telephone handsets.

20. A non-transitory computer readable medium having instructions thereon configured to instruct a processor to:

establish a group call communication session between a wireless communication infrastructure and a plurality of mobile communication units comprising a master communication unit and at least one slave communication unit, using a long range wireless communication protocol;

receive a slave status notification comprising an identifier for said at least one slave communication unit;

facilitate communication, during said group call communication session, of group call information from the wireless communication infrastructure to said master communication unit, and exclusive of communication to said at least one slave communication unit, using said long range wireless communication protocol;

facilitate redistribution of the group call information from the master communication unit to the at least one slave communication unit using said local wireless communication protocol;

receive a termination notification from said at least one slave communication unit using said wireless communication infrastructure when said at least one slave communication unit is not capable of communication with said master communication unit via said local wireless communication protocol, said termination notification comprising an identifier for said at least one slave communication unit; and subsequent to receiving said termination notification, facilitating continued communication of said group call information, using said long range communication protocol, from said wireless communication infrastructure to the at least one slave communication unit that corresponds to said identifier.

* * * * *